US012513753B2

(12) United States Patent
Wang et al.

(10) Patent No.: US 12,513,753 B2
(45) Date of Patent: Dec. 30, 2025

(54) DEVICE PAIRING TECHNIQUES

(71) Applicant: Microsoft Technology Licensing, LLC, Redmond, WA (US)

(72) Inventors: Shuoqi Scott Wang, Redmond, WA (US); Tero J. Patana, Kirkland, WA (US); James McColl Shields, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/212,778

(22) Filed: Mar. 25, 2021

(65) Prior Publication Data

US 2022/0312507 A1 Sep. 29, 2022

(51) Int. Cl.
*H04L 29/06* (2006.01)
*G06T 1/00* (2006.01)
(Continued)

(52) U.S. Cl.
CPC ............. *H04W 76/10* (2018.02); *H04W 4/80* (2018.02); *H04W 84/12* (2013.01)

(58) Field of Classification Search
CPC ......... H04W 76/10; H04W 4/80; H04W 4/02; H04W 48/20; H04W 84/12; H04W 12/50;
(Continued)

(56) References Cited

U.S. PATENT DOCUMENTS 7,724,717 B2 * 5/2010 Porras .................. H04W 12/06
370/332
8,858,323 B2 * 10/2014 Nguyen .................. G07F 17/32
463/29
(Continued)

FOREIGN PATENT DOCUMENTS

EP 3276527 A1 1/2018
IN 45/2016 A 10/2016
(Continued)

OTHER PUBLICATIONS

"Indoor Positioning, Tracking and Indoor Navigation with Wi-Fi", Retrieved from: https://web.archive.org/web/20200923100706/https:/www.infsoft.com/technology/positioning-technologies/wi-fi, Sep. 23, 2020, 4 Pages.
(Continued)

*Primary Examiner* — Edan Orgad
*Assistant Examiner* — Vanneilian Lalchinthang (57) ABSTRACT

Aspects of the present disclosure relate to device pairing techniques based on an association between a wireless fingerprint and a target computing device. In examples, wireless signal information associated with nearby computing devices is detected and used to identify a matching wireless fingerprint. For example, the wireless fingerprint may comprise entries for a plurality of devices, each of which may include a signal strength range for a device. Thus, when the signal strengths of the nearby devices are determined to match the wireless fingerprint, a connection may be automatically established with a target device associated with the wireless fingerprint. As such, rather than manually pairing a computing device with the target device, it may be determined that the computing device is in an environment associated with the target device by virtue of identifying a matching wireless fingerprint, such that a connection is automatically established with the target device.

20 Claims, 8 Drawing Sheets

(51) Int. Cl.
  *H04W 4/80* (2018.01)
  *H04W 12/50* (2021.01)
  *H04W 48/20* (2009.01)
  *H04W 76/10* (2018.01)
  *H04W 84/12* (2009.01)

(58) Field of Classification Search
  CPC . H04W 12/06; H04W 12/069; H04W 12/108; H04W 12/63; H04L 63/0876; H04L 63/0428; H04L 63/0823; H04L 9/006; H04L 63/126; H04M 15/8271; H04M 3/42017; H04N 21/4305
  USPC ......................................................... 370/328
  See application file for complete search history.

(56) References Cited

U.S. PATENT DOCUMENTS

| | | | | |
|---|---|---|---|---|
| 9,378,634 | B1* | 6/2016 | Kashyap | H04B 17/318 |
| 9,704,318 | B2* | 7/2017 | Zakaria | G07C 9/00571 |
| 9,913,092 | B2* | 3/2018 | Chan | G01S 5/02521 |
| 10,122,736 | B2* | 11/2018 | Baxley | H04W 12/122 |
| 11,307,286 | B1* | 4/2022 | Wang | G06N 20/00 |
| 11,627,469 | B2* | 4/2023 | Wong | H04L 9/3271 |
| | | | | 726/6 |
| 2011/0269479 | A1* | 11/2011 | Ledlie | G01S 5/0081 |
| | | | | 702/180 |
| 2011/0286437 | A1* | 11/2011 | Austin | H04M 15/8271 |
| | | | | 370/338 |
| 2011/0306354 | A1* | 12/2011 | Ledlie | H04W 4/029 |
| | | | | 455/456.1 |
| 2014/0342754 | A1* | 11/2014 | Liu | G01S 5/0252 |
| | | | | 455/456.2 |
| 2015/0019280 | A1* | 1/2015 | Mejegard | H04W 24/08 |
| | | | | 705/7.23 |
| 2015/0289124 | A1* | 10/2015 | Palin | H04M 1/72412 |
| | | | | 455/41.2 |
| 2015/0358314 | A1* | 12/2015 | Glik | H04M 1/72412 |
| | | | | 726/7 |
| 2018/0098377 | A1* | 4/2018 | Allada | G09G 5/003 |
| 2018/0349588 | A1* | 12/2018 | Abdelmoneum | G06F 21/32 |
| 2019/0306166 | A1* | 10/2019 | Konda | H04W 12/73 |
| 2022/0264732 | A1* | 8/2022 | Meerbeek | H05B 47/19 |

FOREIGN PATENT DOCUMENTS

| | | | | |
|---|---|---|---|---|
| WO | 2021013522 | A1 | 1/2021 | |
| WO | WO-2021023032 | A1* | 2/2021 | G06K 9/00006 |

OTHER PUBLICATIONS

"Take Your Wi-Fi Room to-Room with Seamless Roaming", Retrieved from: https://web.archive.org/web/20160529073357/https:/www.linksys.com/us/seamless-roaming/, May 29, 2016, 4 Pages.

"Invitation To Pay Additional Fees Issued In PCT Application No. PCT/US22/020100", Mailed Date: Jun. 29, 2022, 10 Pages.

"International Search Report and Written Opinion Issued in PCT Application No. PCT/US22/020100", Mailed Date: Aug. 22, 2022, 16 Pages.

* cited by examiner

DEVICE PAIRING TECHNIQUES

BACKGROUND

A procedure used to pair a computing device with another computing device may be counterintuitive to a user, especially in instances where the user is not familiar with the devices and/or such procedures. Further, variability and inconsistency across computing devices may introduce additional complexity to device pairing procedures, as may be the case when one computing device is used between two or more target computing devices, thereby potentially requiring that the device be re-paired with each respective target device for use by the user.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to device pairing techniques based on an association between a wireless fingerprint and a target computing device. For example, a wireless fingerprint may have been generated based on surrounding wireless devices and associated wireless signal information, such as signal strength and/or signal frequency. Accordingly, wireless signal information associated with nearby computing devices is detected and used to identify a matching wireless fingerprint. For example, the wireless fingerprint may comprise entries for a plurality of devices, each of which may include a signal strength range for a device. Thus, when the signal strengths of the nearby devices are determined to match the wireless fingerprint, a connection may be automatically established with a target device associated with the wireless fingerprint. As such, rather than manually pairing a computing device with the target device, it may be determined that the computing device is in an environment associated with the target device by virtue of identifying a matching wireless fingerprint, such that a connection is automatically established with the target device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, computing devices are paired to enable wireless communication between the computing devices. For example, a computing device, such as a game controller, mouse, keyboard, or headset may be paired with a target device (e.g., a game console, mobile computing device, or a desktop computing device), such that the computing device and target device may each wirelessly communicate with one another. However, each device may have an associated pairing procedure and, further, pairing procedures may not be the same between devices. For example, the procedure may vary depending on manufacturer, device type, or even whether the devices have been paired before. Accordingly, such complexity may result in user frustration, reduced performance or usability resulting from delayed or failed device pairing, or unintended behavior by the computing device and/or target device.

Accordingly, aspects of the present disclosure relate to device pairing techniques. In examples, a wireless fingerprint is associated with a target device. When a computing device identifies wireless signal information associated with the wireless fingerprint, the computing device may determine to pair with the target device associated therewith. Thus, a first wireless fingerprint may be associated with a first target device in a first location, while a second wireless fingerprint may be associated with a second target device in a second location. When a user moves the computing device from the first location to the second location, the computing device may determine that detected wireless signal information matches the second wireless fingerprint, such that the computing device automatically connects with the second target device. As a result, rather than manually pairing the computing device with the second target device, the computing device may automatically establish a connection with the second target device based at least in part on identifying the second wireless fingerprint.

As used herein, a wireless "fingerprint" or "signature" is generated according to wireless signal information associated with a plurality of devices. For example, the computing device may detect signals from other devices using Wi-Fi, Bluetooth, ultra-wideband (UWB), and/or cellular radios. Detected wireless signal information may be used to generate a device entry comprising an identifier associated with a device (e.g., a media access control (MAC) address or an extended service set identifier (ESSID)), a frequency (e.g., one or more predefined wireless channels, a specific frequency, or a range of frequencies), and/or a signal strength. In some examples, a wireless fingerprint entry may comprise a range of observed or expected signal strengths for a computing device based on a set of historical observations. Thus, the wireless fingerprint comprises multiple device entries for detected devices. In some entries, a single computing device may have multiple entries, as may be the case when a device utilizes multiple wireless technologies.

Accordingly, signal information detected by a computing device may be processed to determine whether there is a matching wireless fingerprint. The determination may comprise evaluating a detected signal strength as compared to a historical or an expected range indicated by a fingerprint entry, such that a device signal strength within the range is determined to match the fingerprint entry. In other examples, the match need not be exact, such that a signal strength different from an expected value or outside of an expected range is identified as a partial match. For instance, a numeric value may be used to indicate the degree to which an entry is matched, where a match within a range is assigned a value of 1.0, while the value decreases depending on the degree to which the detected strength differs from the strength indicated by the fingerprint entry.

In some instances, a fingerprint may be evaluated according to weights associated with fingerprint entries therein. For instance, it may be determined that the signal strength of a device exhibits a higher degree of variability, as may be the case if the device is a portable device such as a Bluetooth peripheral or a mobile computing device. By contrast, the signal strength of other devices may exhibit a low degree of variability, such as wireless access points, printers, or desktop computing devices. As a result of having a more consistent signal strength, such devices may be given a higher weight when evaluating a wireless fingerprint match. Thus, fingerprint entries associated with devices that are observed to be more consistent may be given a higher weight than devices that are less consistent.

A set of wireless fingerprints may be ranked according to which fingerprint is most similar to the detected wireless signal information. As noted above, each entry may be weighted, such that associated weights may be used to generate an overall score for a fingerprint. In some instances, a fingerprint may be updated as a result of a change in detected wireless signal information as compared to the wireless fingerprint. For example, if a score for a wireless fingerprint exceeds a predetermined threshold, it may be determined that the detected wireless signal information matches the fingerprint, such that wireless signal information that deviates from one or more entries may be used to update such entries accordingly. As an example, a range of signal strengths may be updated based on the detected signal strength for a device or, as a further example, a fingerprint entry may be added or removed based on determining that a device is or is not present in the detected wireless signal information.

It will be appreciated that a wireless fingerprint may be updated according to any of a variety of other techniques. For example, user input may be received associated with entries of a wireless fingerprint, such that the user may increase a weighting of an entry (e.g., as may be the case for a device owned by the user), remove an entry (e.g., as may be the case for a device that frequently fluctuates or that is not owned by the user), and/or indicate that a device associated therewith should always be included or omitted from one or more wireless fingerprints. As another example, a user may request that a wireless fingerprint and/or one or more entries therein be updated according to current wireless signal information.

Thus, it will be appreciated that a "matching" wireless fingerprint need not be a full or exact match, but rather may be determined based on generating a score for a wireless fingerprint based on detected wireless signal information, which may then be compared to a predetermined threshold. Further, it will be appreciated any of a variety of alternative or additional evaluations may be performed to determine whether a fingerprint matches detected wireless signal information. For example, wireless frequencies or channels may be evaluated, as may be the case when multiple wireless access points share the same ESSID. As another example, a weight may be determined based at least in part on a device type (e.g., as may be indicated by the wireless signal information) and/or a device manufacturer (e.g., as may be determined based on an Organizationally Unique Identifier (OUI) of the device's MAC address).

In some instances, when a matching fingerprint is identified, a target device associated therewith may be determined, such that the computing device connects to the determined target device accordingly. Establishing a connection with the target device may comprise establishing a new connection, re-pairing with the target device, or utilizing an existing connection (e.g., as may be the case when the computing device maintains multiple connections to multiple devices). It will be appreciated that a wireless communication technology associated with the detected wireless signal information need not be the same wireless communication technology that is used to communicate with the target device. For example, the computing device may evaluate Wi-Fi wireless signal information and communicate with the target device via Bluetooth.

As noted above, the computing device may connect with the target device when a matching wireless fingerprint is identified (e.g., when the match with the wireless fingerprint exceeds a predetermined threshold). In other examples, the computing device may already be connected with another device, such that it may first be determined whether the computing device should transition from the other device to the target device associated with the wireless fingerprint. For example, user input may be requested to confirm that the computing device should transition or, as another example, it may be determined whether the target device is in a state associated with the computing device (e.g., whether the target device is powered on or whether the target device is executing an associated application).

Thus, any of a variety of connection rules may be processed to determine whether to connect with a target device. A rule may comprise evaluating the state of the computing device (e.g., whether the device is connected to a different device or a mode of operation of the device), data associated with or provided by the target device (e.g., if the device is powered on or is executing an associated application), or requesting user input, among other examples. Finally, if a matching wireless fingerprint is not identified or a set of connection rules is not satisfied, the computing device may not connect with a target device or a manual pairing procedure may be completed by a user, such that an association may be formed between a fingerprint for the detected wireless signal information and the newly paired target device.

Figure 1:
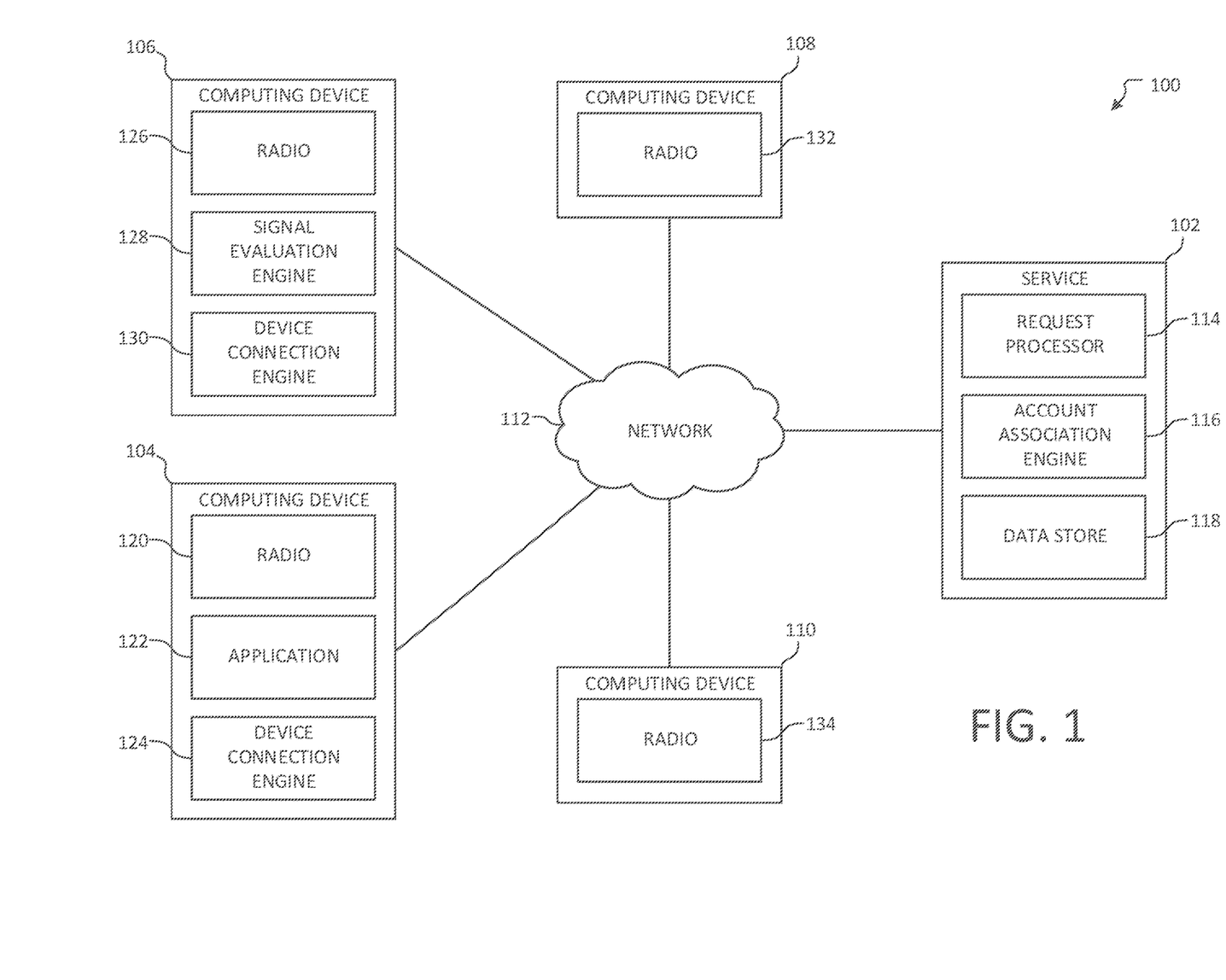
FIG. 1 illustrates an overview of an example system in which aspects of the disclosed device pairing techniques may be implemented.

FIG. 1 illustrates an overview of an example system 100 in which aspects of the disclosed device pairing techniques may be implemented. As illustrated, system 100 comprises service 102, computing device 104, computing device 106, computing device 108, computing device 110, and network 112. In examples, service 102 and computing devices 104-110 communicate using network 112, which may comprise a local area network, a wireless network, or the Internet, or any combination thereof, among other examples. For example, network 112 may comprise peer-to-peer communications between devices 104-110 (e.g., via Bluetooth or Wi-Fi Direct).

Computing devices 104-110 may be any of a variety of computing devices, including, but not limited to, a gaming console computing device, a desktop computing device, a mobile computing device, a tablet computing device, a headset computing device, a wearable computing device, a peripheral computing device, a smart home computing device (e.g., a wireless speaker device, a virtual assistant device, a smart thermostat device, a smart lighting device, or a variety of other Internet-of-things devices), or an automotive vehicle with wireless connectivity. It will be appreciated that any of a variety of computing devices may be a "target" computing device as used herein. Further, a computing device may act as a target device in one instance (e.g., where another computing device is connecting to it) and may act as a computing device connecting to a target device in other examples.

Service 102 is illustrated as comprising request processor 114, account association engine 116, and data store 118. In examples, data store 118 of service 102 stores user accounts of users associated therewith. Accordingly, account association engine 116 may associate computing devices owned, used, or otherwise associated with a user (e.g., one or more of computing devices 104-110) with the user's account. As a result, if a user purchases a new computing device or accesses the user account from a computing device, request processor 114 may provide an indication of the user's other computing devices, such that the computing device may pair itself with one or more of the indicated devices. Similarly, if a new computing device is added to the user's account, request processor 114 may provide an indication to the user's other devices, such that the user need not manually pair the device with the other devices.

Service 102 may further enable a user to configure aspects of the device pairing techniques described herein. For example, a user may specify that a computing device should not automatically transition between devices (e.g., thereby disabling automatic connections based on identified wireless fingerprints) or may manage wireless fingerprints and associated target devices of a computing device. For instance, the user may indicate that a computing device and associated wireless fingerprints should be purged from the user's account and associated devices, as may be the case when the user no longer owns the indicated computing device.

Computing device 104 is illustrated as comprising radio 120, application 122, and device connection engine 124. In examples, radio 120 comprises any of a variety of radio transceivers, including, but not limited to, a Wi-Fi transceiver, a Bluetooth transceiver, and/or a UWB transceiver. It will be appreciated that, in some examples, a radio need not be a transceiver, but may instead be a receiver or a transmitter. For example, radio 120 of computing device 104 may comprise a near-field communication (NFC) tag that is detectable by a radio of another device.

Application 122 of computing device 104 may be any of a variety of applications. For example, application 122 may comprise a video game application and computing device 104 may be a game console. As another example, application 122 may be a mobile application or a web-based application and computing device 104 may be a mobile computing device.

Device connection engine 124 manages connections between computing device 104 and any of a variety of other devices (e.g., computing devices 106-110), for example via radio 120. For example, device connection engine 124 may facilitate a manual pairing procedure of computing device 104 to establish a connection with computing device 106. As a result, device connection engine 124 may store an association with computing device 106, such that computing device 104 and computing device 106 may reestablish a connection in the future. In some instances, device connection engine 124 accesses a list of computing devices associated with a user account of service 102 (e.g., via request processor 114, as may be stored by data store 118 as discussed above). Accordingly, device connection engine 124 may establish connections with devices associated with a user's account, thereby simplifying or eliminating a manual device pairing procedure.

Computing device 106 is illustrated as comprising radio 126, signal evaluation engine 128, and device connection engine 130. Some aspects of such elements may be similar to those discussed above with respect to computing device 104 and are therefore not necessarily re-described in detail below. Computing device 106 is illustrated as comprising signal evaluation engine 128, which may process wireless signal information from radio 126. For example, signal evaluation engine 128 may generate or update a wireless fingerprint according to aspects described herein.

As illustrated, system 100 further comprises computing devices 108 and 110, each having radio 132 and 134, respectively. Wireless signal information detected by radio 126 and processed by signal evaluation engine 128 may comprise wireless signal information associated with computing device 108 (e.g., as may be transmitted by radio 132) and wireless signal information associated with computing device 110 (e.g., as may be transmitted by radio 134). Computing device 106 need not be paired or in communication with computing device 108 or 110. Rather, computing device 106 may identify any of a variety of signals emitted by radios 132 and/or 134, regardless of whether they are unidirectional transmissions or bidirectional communications (e.g., among any of a variety of computing devices 104-110).

Thus, a wireless fingerprint generated by signal evaluation engine 128 may comprise an entry associated with computing device 108, an entry associated with computing device 110, and/or an entry associated with computing device 104. As discussed above, each entry may have an associated weight, for example based at least in part on a device's signal variability, manufacturer, and/or role (e.g., whether the device is acting as a host or based on the device's profile). For example, computing device 108 may be a mobile device with a location that changes frequently and therefore experiences more signal variability than computing device 110, which may be a wireless access point. As a result, computing device 110 may be assigned a higher weight than computing device 108.

Accordingly, when computing device 106 pairs with computing device 104 (e.g., as may be completed via a pairing procedure managed by device connection engines 130 and 124, respectively), the wireless fingerprint generated by signal evaluation engine 128 may be associated with computing device 104. In such an example, computing device 104 may be referred to as a "target device" with respect to computing device 106. As a result, when signal evaluation 128 identifies wireless signal information that matches the wireless fingerprint (e.g., comprising wireless signal information associated with computing devices, 104, 108, and/or 110, for example each having a signal strength within a historical strength range), device connection engine 130 may establish a connection with computing device 104 based at least in part on the association.

Similarly, signal evaluation engine 128 may update a wireless fingerprint based on changing wireless signal information, for example while computing device 106 is connected to computing device 104. It will be appreciated that a manual pairing procedure need not be performed and, as another example, device connection engine 130 may establish a connection based on determining computing device 104 is associated with a user account of service 102. An association between computing device 104 and a wireless fingerprint may then be generated accordingly.

In some instances, device connection engine 130 processes a set of connection rules to determine whether to connect to a computing device. For example, if a matching wireless fingerprint is identified, a state of the associated target device may be evaluated. As an example, it may be determined whether the target device is powered on and/or whether the target device is executing an associated application (e.g., whether computing device 104 is executing application 122). In some instances, service 102 may provide information associated with the state of the target device or, as another example, the target device may broadcast its status (e.g., via radio 120 of computing device 104). As another example, it may be determined whether the user has enabled or disabled device connection techniques according to the disclosed aspects for the target device (e.g., as may be specified by a user account of service 102). In some instances, a connection rule may comprise requesting user input to confirm whether computing device 106 should connect to the identified device. User input may comprise an explicit indication from a user (e.g., a user providing a positive or negative indication in response to a prompt) or an implicit indication from the user (e.g., ignoring a prompt to prevent computing device 106 from connecting to computing device 104).

In some instances, the degree to which a wireless fingerprint matches the detected wireless signal information may be evaluated based on a predetermined threshold. As a result, if the match exceeds the predetermined threshold, device connection engine 130 may establish a connection with computing device 104 without evaluating the set of connection rules or, as another example, at least a subset of the connection rules may be omitted. Thus, it will be appreciated that any of a variety of techniques may be used to determine whether to connect to a target computing device based on identifying a matching wireless fingerprint. Further, it will be appreciated that a wireless fingerprint need not be associated with only a single target computing device (nor is a target computing device limited to having an association with a single wireless fingerprint), such that connections may be established with multiple target devices based on identifying a matching wireless fingerprint. As a further example, connections may be established with a subset of associated devices as a result of evaluating matching rules according to aspects described herein.

While examples are described above with respect to computing device 106 establishing a connection with computing device 104 (e.g., such that computing device 104 is acting as a target device), it will be appreciated that, in other examples, any of a variety of other devices may pair with one another. For example, computing device 104 may pair with computing device 110, such that, in the first example, computing device 104 was the target device, while in the instant example, computing device 110 is acting as the target device. Further, it will be appreciated that while functionality is discussed above with respect to various computing devices and associated elements therein, functionality may be implemented by or distributed among any of a variety of computing devices.

Figure 2:
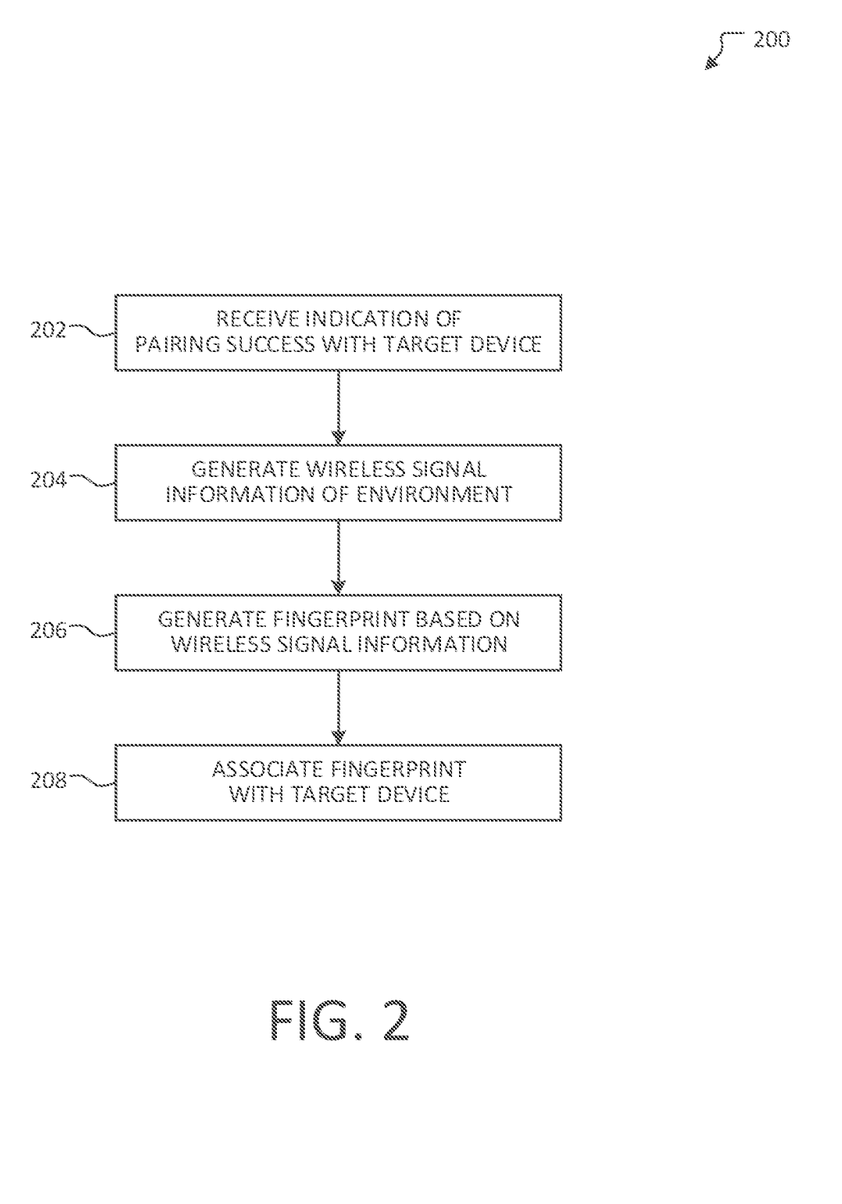
FIG. 2 illustrates an overview of an example method for pairing a computing device with a target device and generating a wireless fingerprint associated therewith.

FIG. 2 illustrates an overview of an example method 200 for pairing a computing device with a target device and generating a wireless fingerprint associated therewith. In examples, aspects of method 200 are performed by a computing device, such as one of computing devices 104-110 discussed above with respect to FIG. 1. For example, aspects of method 200 may be performed by a signal evaluation engine, such as signal evaluation engine 128 of computing device 106 in FIG. 1.

Method 200 begins at operation 202, where an indication of pairing success with a target device is received. In examples, the indication may be received from a device connection engine, such as device connection engine 124 or 130 discussed above with respect to FIG. 1. For example, the indication may be received as a result of a user successfully completing a manual pairing procedure between the computing device and the target device. As another example, the indication may be received as a result of the computing device automatically pairing with the target device, as may be performed by a device connection engine based on devices associated with a user account of a service, such as service 102 in FIG. 1.

As a further example, the indication need not be an indication of initial pairing success, but may instead be an indication that a connection was established with the target device (e.g., as may be the case after the devices are initially paired). Thus, aspects of method 200 may be performed to generate a new association between a wireless fingerprint and a target device or to update a wireless fingerprint/target device association, among other examples.

Flow progresses to operation 204, where wireless signal information of the environment is generated. For example, wireless signal information may be detected by a radio, such as one of radios 120, 126, 132, or 134 in FIG. 1. In examples, operation 204 comprises detecting wireless signal information using any of a variety of radio frequencies and/or protocols. For example, Wi-Fi signals, Bluetooth signals, and/or UWB signals may be detected at operation 204. In some instances, the wireless signal information is processed to determine device identifiers (e.g., a device name, an ESSID, or a MAC address), a manufacturer, profile type, one or more wireless frequencies (e.g., channels or bands), and/or signal strengths of devices therein. While example radios, protocols, and associated wireless information is described herein, it will be appreciated that aspects of the present application may be applied to any of a variety of alternative or additional wireless technologies.

At operation 206, a wireless fingerprint is generated based on the wireless signal information of the environment. For example, the wireless fingerprint may comprise entries for devices within the wireless signal information as described above. In some instances, the wireless signal information may be filtered to omit devices having a signal strength below a predetermined threshold or having information indicative that they may exhibit more variability than other devices (e.g., based on profile type, role such as a Bluetooth host, or manufacturer). In other instances, a wireless fingerprint may comprise a number of entries at or below a predetermined number. For example, the top 10 devices based on signal strength may be used to generate a fingerprint at operation 206. In other instances, operation 204 comprises generating multiple samples, such that variability of signal strength may be determined over time. Accordingly, a predetermined number of devices exhibiting the lowest degree of variability may be used to generate the wireless fingerprint. As discussed above, device entries may comprise an expected or historical signal strength range based on multiple samples generated at operation 204.

Flow progresses to operation 208, where the fingerprint is associated with the target device that was indicated at operation 202. For example, the association may be stored local to the computing device and/or provided to a service (e.g., service 102) for storage. In such instances, other computing devices may utilize the fingerprint and association with the target device to establish a connection with the target device according to aspects described herein.

Thus, wireless fingerprints and such associations may be shared among devices associated with a user account. In some instances, sharing may be limited to a subset of user devices, as may be the case depending on the hardware capabilities of a device. For example, differing antenna designs may cause inconsistencies between detected signal strengths among devices, such that a wireless fingerprint for one device may not be accurate for another device. In such instances, a wireless fingerprint may be stored or converted to a standardized form or to a device-specific form based on known signal attenuation characteristics. As another example, one device may have different radio capabilities than another device, such that at least a part of the wireless fingerprint may not be usable by the device (e.g., the device may be able to detect Wi-Fi and/or Bluetooth signals, but not UWB signals). Flow terminates at operation 208.

Figure 3:
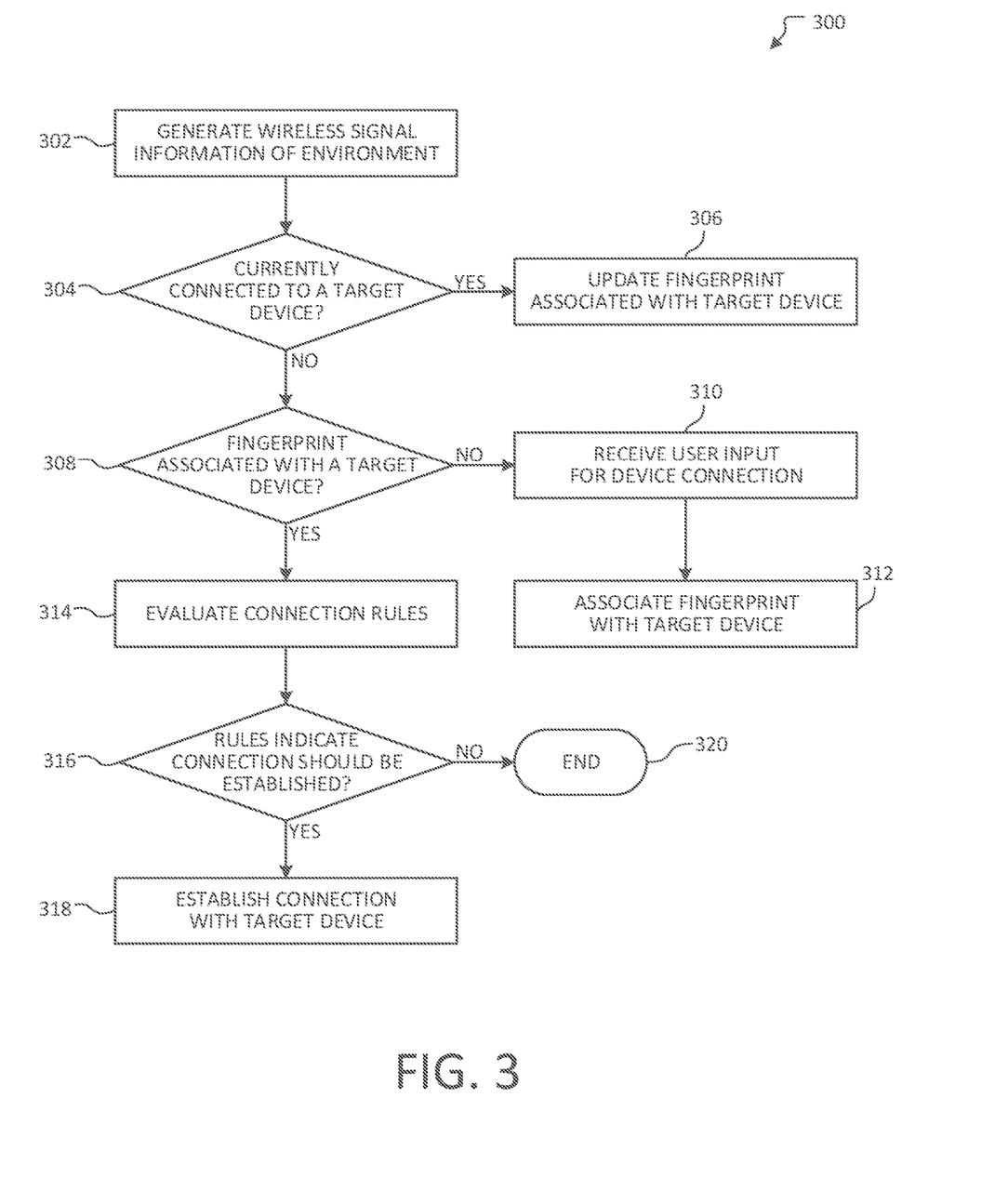
FIG. 3 illustrates an overview of an example method for connecting with a computing device based on an associated fingerprint according to aspects of the present disclosure.

FIG. 3 illustrates an overview of an example method 300 for connecting with a computing device based on an associated fingerprint according to aspects of the present disclosure. In examples, aspects of method 300 are performed by a computing device, such as one of computing devices 104-110 discussed above with respect to FIG. 1. For example, aspects of method 300 may be performed by a signal evaluation engine, such as signal evaluation engine 128 of computing device 106 in FIG. 1.

Method 300 begins at operation 302, where wireless signal information of the environment is generated. For example, wireless signal information may be detected by a radio, such as one of radios 120, 126, 132, or 134 in FIG. 1. In examples, operation 302 comprises detecting wireless signal information using any of a variety of radio frequencies and/or protocols. For example, Wi-Fi signals, Bluetooth signals, and/or UWB signals may be detected at operation 302. In some instances, the wireless signal information is processed to determine device identifiers (e.g., a device name, an ESSID, or a MAC address), a manufacturer, profile type, one or more wireless frequencies (e.g., channels or bands), and/or signal strengths of devices therein. While example radios, protocols, and associated wireless information is described herein, it will be appreciated that aspects of the present application may be applied to any of a variety of alternative or additional wireless technologies.

At determination 304, it is determined whether the computing device is connected to a target device. For example, it may be determined whether a connection is established with one or more devices associated with a stored wireless fingerprint. Accordingly, if it is determined that there is a connection to a target computing device, flow branches "YES" to operation 306, where a fingerprint associated with the target device is updated. For example, one or more fingerprint entries may be added, removed, or updated as described above. Flow terminates at operation 306. Thus, a wireless fingerprint may be updated over time to adapt to the changing environment in which a target device is used.

If, however, it is determined that the computing device is not currently connected to a target device, flow instead branches "NO," where it is determined whether there is a fingerprint that matches the wireless signal information that was generated at operation 302. As described herein, a match need not be an exact match, but rather may be determined based on generating a matching score for a wireless fingerprint using the generated wireless signal information. For example, the matching score may be compared to a predetermined threshold to determine whether the wireless fingerprint matches the generated wireless signal information.

If it is determined that there is not a matching wireless fingerprint, flow branches "NO" to operation 310, where user input is received for device connection. Example user input includes, but is not limited to, user input associated with a manual device pairing procedure to establish a connection with a target device or a user selection from a list of candidate target devices with which to connect. For example, a list of devices associated with a user account may be retrieved from a service (e.g., service 102 in FIG. 1), such that the user may select and subsequently connect to a target device accordingly.

Flow progresses to operation 312, where the target device is associated with a wireless fingerprint (e.g., as may be generated based on the wireless signal information generated at operation 302). Accordingly, subsequent iterations of method 300 may instead branch "YES" at determination 308 as a result of associating the wireless fingerprint with the target device, such that a connection may automatically be established with the target device according to aspects described herein. Flow terminates at operation 312.

If, however, it is determined that there is a matching wireless fingerprint at determination 308, flow instead branches "YES" to operation 314, where a set of connection rules are evaluated. In some examples, at least some connections rules may be user-configurable (e.g., as may be configured on-device or via a service, such as service 102 in FIG. 1). Example connection rules include, but are not limited to, whether the target device is powered on, whether the target device is executing an application associated with the computing device, and/or the degree to which the wireless fingerprint matches the generated wireless signal information. In some instances, evaluating the connection rules may comprise requesting and/or evaluating user input. For example, a connection rule may request user confirmation that a connection should be established with the target device or, as another example, a connection rule may identify implicit user input indicating that the connection should be established. Thus, it will be appreciated that at least some connection rules may be device-specific and/or user-specific, among other examples.

Flow progresses to determination 316, where it is determined whether the set of connection rules indicate that the connection should be established. In some examples, the evaluation at operation 314 may be hierarchical or follow a progression, such that a determination by one rule that a connection should or should not established precludes the evaluation of subsequent rules. In other instances, rules may be interdependent, such that multiple rules may collectively indicate that a connection should be established with the target device. If it is not determined to establish a connection with the target device, flow branches "NO" and ends at operation 320.

However, if it is instead determined that a connection should be established, flow branches "YES" to operation 318, where a connection is established with the target device. In examples, operation 318 may further comprise updating the wireless fingerprint associated with the target device, which may comprise aspects similar to those discussed above with respect to operation 306. Flow terminates at operation 318.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
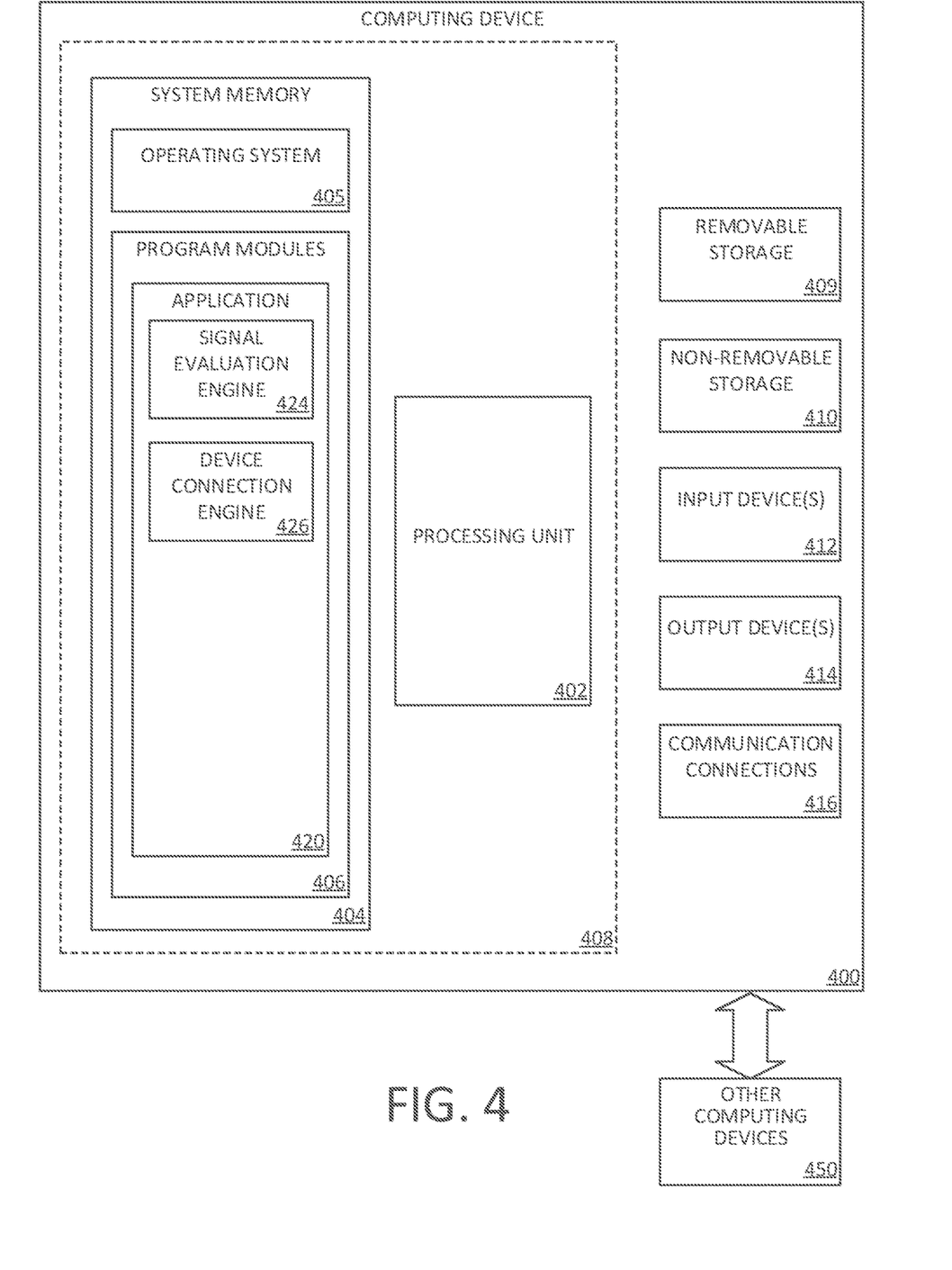
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including service 102 and computing devices 104-110 in FIG. 1. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may store signal evaluation engine 424 and deice connection engine 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
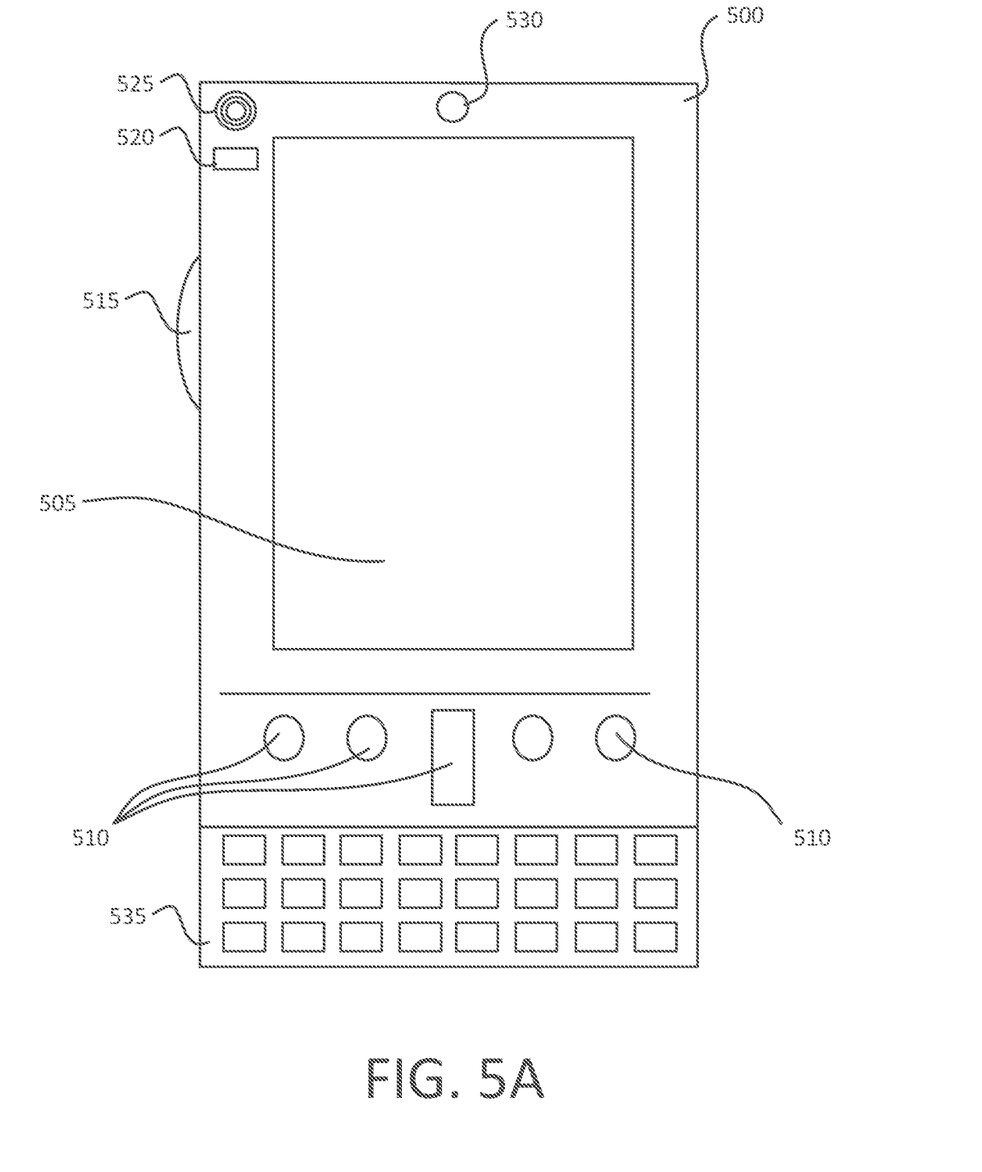
FIGS. 5A and 5B are simplified block diagrams of a mobile computing device with which aspects of the present disclosure may be practiced.
Figure 5B:
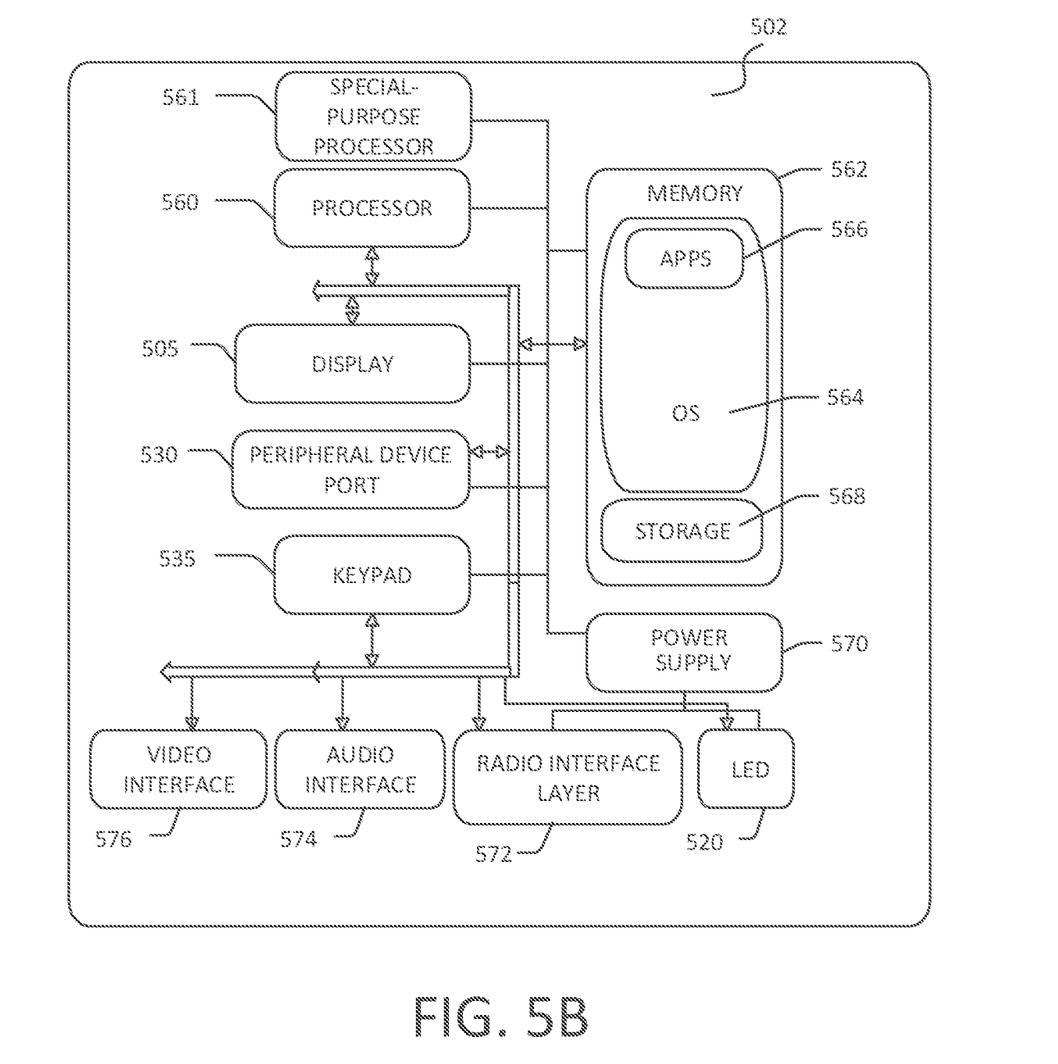

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network Similarly, such data/information may be readily transferred between computing devices for storage and use according to well-known data/information transfer and storage means, including electronic mail and collaborative data/information sharing systems.

Figure 6:
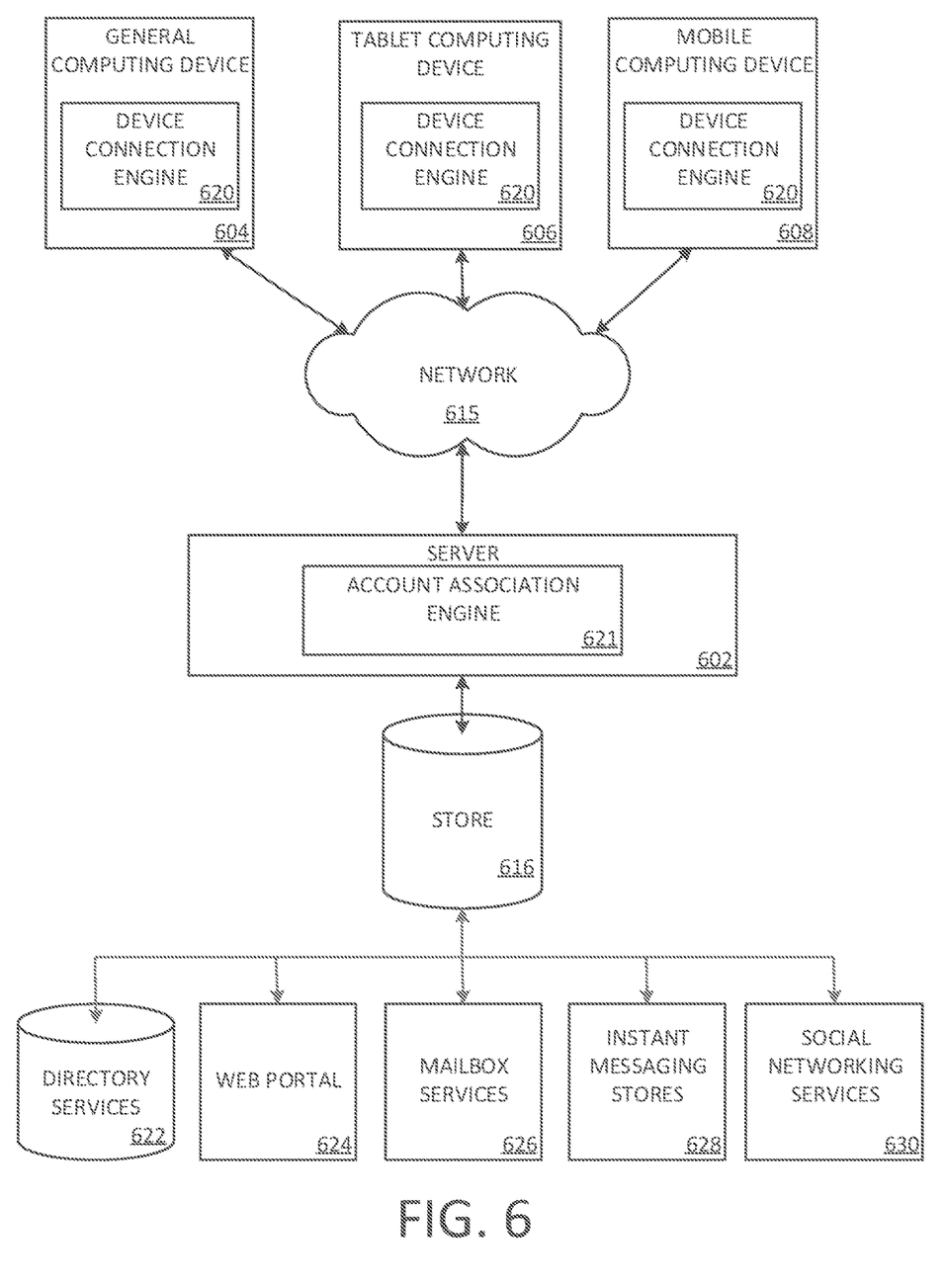
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A device connection engine 620 may be employed by a client that communicates with server device 602, and/or account association engine 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
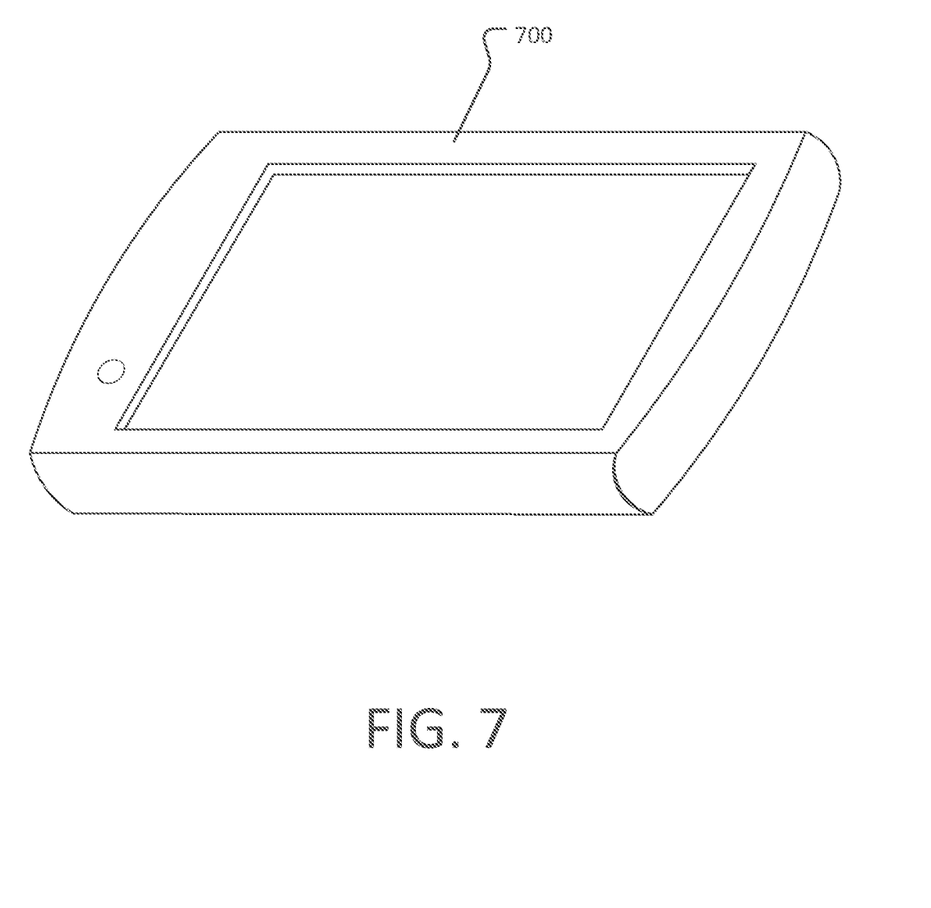
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: at least one processor; and memory storing instructions that, when executed by the at least one processor, causes the system to perform a set of operations. The set of operations comprises: generating wireless signal information associated with at least a first radio signal from a first computing device and a second radio signal from a second computing device; processing the generated wireless signal information to identify a matching wireless fingerprint associated with a target device; and in response to identifying the matching wireless fingerprint, establishing a wireless connection with the target device. In an example, the wireless fingerprint comprises: a first entry associated with the first computing device; and a second entry associated with the second computing device. In another example, the first entry comprises a first signal strength range associated with a historical signal strength of the first computing device; and the second entry comprises a second signal strength range associated with a historical signal strength of the second computing device. In a further example, identifying the matching wireless fingerprint comprises determining that: a first signal strength of the first radio signal is within the first signal strength range; and a second signal strength range of the second radio signal is within the second signal strength range. In yet another example, the wireless fingerprint comprises: a first weight for the first entry based on a variability of the historical signal strength of the first computing device; and a second weight for the second entry based on a variability of the historical signal strength of the second computing device. In a further still example, the first radio signal is a Wi-Fi radio signal and the second radio signal is a Bluetooth radio signal. In another example, the first computing device is the second computing device.

In another aspect, the technology relates to a method for generating a wireless fingerprint associated with a target device, the method. The method comprises: determining a computing device is paired with a target device; detecting wireless signal information associated with at least a first radio signal from a first computing device and a second radio signal from a second computing device; generating, based on the detected wireless signal information, a wireless fingerprint comprising: a first entry associated with the first computing device; and a second entry associated with the second computing device; and storing the generated wireless fingerprint in association with the target device. In an example, detecting the wireless signal information comprises generating a first sample of wireless signal information and a second sample of wireless signal information; and generating the wireless fingerprint comprises: determining, for the first computing device, a first signal strength range for the first entry based on the first sample and the second sample; and determining, for the second computing device, a second signal strength range for the second entry based on the first sample and the second sample. In another example, the first entry is assigned a first weight based on a variability of the first signal strength range and the second entry is assigned a second weight based on a variability of the second signal strength range. In a further example, determining the computing device is paired with the target device comprises receiving an indication of a manual pairing procedure. In yet another example, the first radio signal is a Wi-Fi radio signal and the second radio signal is a Bluetooth radio signal. In a further still example, the computing device is a controller device and the target device is a game console device.

In a further aspect, the technology relates to a method for establishing a connection between a computing device and a target device based on wireless signal information. The method comprises: generating wireless signal information associated with at least a first radio signal from a first computing device and a second radio signal from a second computing device; processing the generated wireless signal information to identify a matching wireless fingerprint associated with a target device; and in response to identifying the matching wireless fingerprint, establishing a wireless connection with the target device. In an example, the wireless fingerprint comprises: a first entry associated with the first computing device; and a second entry associated with the second computing device. In another example, the first entry comprises a first signal strength range associated with a historical signal strength of the first computing device; and the second entry comprises a second signal strength range associated with a historical signal strength of the second computing device. In a further example, identifying the matching wireless fingerprint comprises determining that: a first signal strength of the first radio signal is within the first signal strength range; and a second signal strength range of the second radio signal is within the second signal strength range. In yet another example, the wireless fingerprint comprises: a first weight for the first entry based on a variability of the historical signal strength of the first computing device; and a second weight for the second entry based on a variability of the historical signal strength of the second computing device. In a further still example, the first radio signal is a Wi-Fi radio signal and the second radio signal is a Bluetooth radio signal. In another example, the first computing device is the second computing device.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory storing instructions that, when executed by the at least one processor, causes the system to perform a set of operations, the set of operations comprising:
        detecting, using a radio transceiver, wireless signal information associated with at least a first radio signal from a first computing device and a second radio signal from a second computing device;
        processing the wireless signal information to identify, from a set of wireless fingerprints, a matching wireless fingerprint that is most similar to the wireless signal information, the set of wireless fingerprints comprising:
            a first wireless fingerprint that has an association with a first target device; and
            a second wireless fingerprint that has an association with a second target device;
        selecting a target device from the first target device or the second target device automatically based on the matching wireless fingerprint, wherein the selection is based on a set of connection rules between the first wireless fingerprint and the first target device or the second wireless fingerprint and the second target device; and
        reestablishing a wireless connection with the target device, wherein reestablishing the wireless connection is performed by updating the matching wireless fingerprint using the radio transceiver used for detecting the wireless signal information.

2. The system of claim 1, wherein the first wireless fingerprint comprises:
    a first entry associated with the first computing device, the first entry comprising a first signal strength associated with the first computing device; and
    a second entry associated with the second computing device, the second entry comprising a second signal strength associated with the second computing device.

3. The system of claim 2, wherein:
    the first entry comprises a first signal strength range, the first signal strength range including the first signal strength; and
    the second entry comprises a second signal strength range, the second signal strength range including the second signal strength.

4. The system of claim 3, wherein the first wireless fingerprint comprises:
    a first weight for the first entry based on a variability of the signal strength of the first computing device; and
    a second weight for the second entry based on a variability of the signal strength of the second computing device.

5. The system of claim 2, wherein identifying the matching wireless fingerprint is based, at least in part, on at least one signal strength selected from:
    the first signal strength; or
    the second signal strength.

6. The system of claim 1, wherein the first radio signal is a Wi-Fi radio signal and the second radio signal is a Bluetooth radio signal.

7. The system of claim 6, wherein the first computing device is the second computing device.

8. A method for generating a wireless fingerprint associated with a target device, the method comprising:
    determining a computing device is paired with the target device, wherein the target device is paired with the computing device for communication via a radio transceiver;
    detecting, using the radio transceiver with which the computing device is paired with the target device, wireless signal information associated with at least a first radio signal from a first computing device that is located at a first location and a second radio signal from a second computing device that is located at a second location different from the first location;
    generating, based on the detected wireless signal information, a first wireless fingerprint comprising:
        a first entry associated with the first computing device, wherein a first weight for the first entry based on a variability of the signal strength of the first computing device; and
        a second entry associated with the second computing device, wherein a second weight for the second entry based on a variability of the signal strength of the second computing device; and
    storing the first wireless fingerprint in association with the target device, thereby causing the computing device to select the target device from a set of computing devices based on detecting the wireless signal information that is more similar to the first wireless fingerprint than to a second wireless fingerprint that is associated with a different target device.

9. The method of claim 8, wherein:
detecting the wireless signal information comprises generating a first sample of wireless signal information and a second sample of wireless signal information; and
generating the first wireless fingerprint comprises:
determining, for the first computing device, a first signal strength for the first entry based on the first sample and the second sample; and
determining, for the second computing device, a second signal strength for the second entry based on the first sample and the second sample.

10. The method of claim 9, wherein the first entry is assigned a first weight based on a variability of the first signal strength and the second entry is assigned a second weight based on a variability of the second signal strength.

11. The method of claim 8, wherein determining the computing device is paired with the target device comprises receiving an indication of a manual pairing procedure.

12. The method of claim 8, wherein the first radio signal is a Wi-Fi radio signal and the second radio signal is a Bluetooth radio signal.

13. The method of claim 8, wherein the computing device is a controller device and the target device is a game console device.

14. The method of claim 8, wherein the first weight and the second weight are used to generate an overall score for the first wireless fingerprint and the second wireless fingerprint.

15. A method for establishing a connection between a computing device and a target device based on wireless signal information, the method comprising:
detecting, using a radio transceiver, the wireless signal information associated with at least a first radio signal from a first computing device and a second radio signal from a second computing device;
processing the wireless signal information to identify a matching wireless fingerprint from a set of wireless fingerprints that is most similar to the wireless signal information, the set of wireless fingerprints comprising:
a first wireless fingerprint that has an association with a first target device; and
a second wireless fingerprint that has an association with a second target device;
selecting a target device from the first target device or the second target device automatically based on the matching wireless fingerprint, wherein the selection is based on a set of connection rules between the first wireless fingerprint and the first target device or the second wireless fingerprint and the second target device; and
reestablishing a wireless connection with the target device, wherein reestablishing the wireless connection is performed by updating the matching wireless fingerprint using the radio transceiver used for detecting the wireless signal information.

16. The method of claim 15, wherein the first wireless fingerprint comprises:
a first entry associated with the first computing device, the first entry comprising a first signal strength associated with the first computing device; and
a second entry associated with the second computing device, the second entry comprising a second signal strength associated with the second computing device.

17. The method of claim 16, wherein:
the first entry comprises a first signal strength range, the first signal strength range including the first signal strength; and
the second entry comprises a second signal strength range, the second signal strength range including the second signal strength.

18. The method of claim 16, wherein identifying the matching wireless fingerprint is based, at least in part, on at least one signal strength selected from:
the first signal strength; or
the second signal strength.

19. The method of claim 15, wherein the first radio signal is a Wi-Fi radio signal and the second radio signal is a Bluetooth radio signal.

20. The method of claim 19, wherein the first computing device is the second computing device.

* * * * *